United States Patent [19]

Ramel et al.

[11] Patent Number: 5,033,045
[45] Date of Patent: Jul. 16, 1991

[54] CIRCUIT ELEMENT - CROSS-POINT BETWEEN TWO BUS LINES

[75] Inventors: Louis Ramel, Clery Saint Andre; Guy Marin, Trebeurden, both of France

[73] Assignee: U.S. Philips Corporation, New York, N.Y.

[21] Appl. No.: 344,163

[22] Filed: Apr. 27, 1989

[30] Foreign Application Priority Data

Apr. 29, 1988 [FR] France ................................. 88 05773

[51] Int. Cl.[5] .............................. H04J 3/02; H04J 3/24
[52] U.S. Cl. ................................. 370/85.13; 370/94.1
[58] Field of Search .................. 340/825.79; 370/85.1, 370/85.12, 85.13, 85.14, 85.15, 85.9, 58.1, 61, 94.1, 60

[56] References Cited

U.S. PATENT DOCUMENTS

| | | | |
|---|---|---|---|
| 3,890,471 | 6/1975 | Hachenburg | 370/85.14 |
| 4,512,011 | 4/1985 | Turner | 370/60 |
| 4,550,402 | 10/1985 | Gable et al. | 370/94.1 |
| 4,597,078 | 6/1986 | Kemph | 370/85.13 |
| 4,821,258 | 4/1989 | Fraser | 370/60 |

FOREIGN PATENT DOCUMENTS 2182528 5/1987 United Kingdom .

OTHER PUBLICATIONS

S. M. Price, "L'Am 90C644 Augmente les Performances des Systèmes Graphiques . . . ", Électronique, Techniques, Industries, #31, Mar. 17, 1986, pp. 63-71.

Primary Examiner—Benedict V. Safourek
Assistant Examiner—H. Kizou
Attorney, Agent, or Firm—Anne E. Barschall

[57] ABSTRACT

The cross-point is intended for ATD multiplexing digital information in the form of packets of fixed lengths between two buses (A-B and C-D); it is constituted by: a first shift register (RAB), a first buffer register (RTE), a RAM (MRAM), a second buffer register (RTS), a second shift register (RCD), and logic circuits constituted by decision units for packet extraction (DE) and insertion (DI), associated with decision Tables (TEX and TIN), and a management unit of the RAM (GM). Packet extractions and insertions are effected in an asynchronous manner relative to each other.

8 Claims, 8 Drawing Sheets

CIRCUIT ELEMENT - CROSS-POINT BETWEEN TWO BUS LINES

The invention relates to a cross-point between two one-way buses independent of one another for ATD multiplexing digital information constituted by consecutive fixed-length data packets transported over the above buses, these packets comprising a label field of n bits and an information field of i bits, n and i being fixed and such that n+i=d, for selectively transmitting digital information from one bus to another.

There are numerous methods and arrangements for switching information from one line to another. The methods and arrangements especially adapted to ATD (Asynchronous Time-Division) packet switching are much less numerous because of the novelty of the ATD concept for information multiplexing. The ATD multiplexing of information actually forms the object of a contribution on the side of the CCITT in view of a standardisation and can be characterised in that the information is cut into packets of fixed lengths, while a label of a fixed length is associated with each packet and permits identification of the message to which each packet belongs. Over the transmission line, the packets are consecutive, that is to say, that in the absence of information the line transports empty packets (of the same length as the others) containing no information at all but each provided with a label to ensure filling of the packet length. ATD technology has for its main object to attain the largest possible streams. This introduces the problem of signal delay time, which cannot be neglected if one wishes to maintain a correct synchronisation between the information carrier signals, their respective clock signals, and the logic decision signals.

The precise technical problem which this invention intends to resolve is to be able to switch the information packets defined above from one line to another as fast as possible, that is to say, from a start bus to an arrive bus, and in that case provide that the information propagation is not delayed over the start and arrive buses. It is to be noted that the packets have sufficiently large lengths, of the order of 256 bits for the information field (i=256) and 16.32 or 48 bits, for example, for the label (n=16.32 or 48). Moreover, for obtaining large information flows over the buses, these buses are generally constituted by several parallel conductors, for example 16 conductors.

In a field of technology which is sufficiently remote from that of the invention, that is, the domain of graphical digital systems, it is also necessary to have a very large information flow at certain points in the system. From the publication "Electronique, Techniques et industries", No. 31, 17 March 1986, a double-array RAM memory is known, which permits to avoid a bottle-neck which limits the flow in the graphical system. This RAM memory comprises two memory zones for a single integrated circuit chip. The first zone is a dynamic 256 K RAM used as a display memory and the second zone is a static 1 K RAM addressed by a counter integrated on the chip which permits serial access to pixel data. These two zones work independently via separate input/output gates, except during the transfer cycles in the course of which the data of the second zone are transferred completely in parallel from the second memory zone to the first, in less than 200 ns. The structure of this memory is not conceived, however, and is not suitable for transferring information from one bus to another.

It is an object of the invention to realise in (an) integrated circuit(s) a cross-point for ATD multiplexing digital information between two buses, very rapidly, to permit a large information flow.

A further object of the invention is to permit the realisation of important change-over switches with the aid of varying architectures using rapid modular cross-points according to the invention as base elements between pairs of buses, as a result of which an extensibility of the arrangement is achieved.

These objects are achieved owing to the fact that the cross-point defined in the first paragraph of the description is characterised in that it is constituted by the combination of two integrated circuit building blocks:

A first building block constituted by the cascaded sequence between one of the above buses, called start bus, and the other bus, called arrive bus of:
- a) a first shift register having (a) series of input(s) and d parallel outputs arranged in a step-by-step fashion over the start bus,
- b) a first buffer register having d parallel inputs and d parallel outputs,
- c) a RAM having m locations of d bits comprising an address bus for the m locations,
- d) a second buffer register having d parallel inputs and d parallel outputs;
- e) a second shift register having d parallel inputs (a) serial output(s) arranged in a step-by-step fashion over the arrive bus, and a second logic switch-decision building block comprising at least, arranged symmetrically relative to the start and arrive buses, an extraction (insertion respectively) decision unit, associated with a preprogrammed decision Table, which receives the label data of the packets over the start bus (over the arrive bus respectively) and controls a management unit of the RAM connected thereto over the above address bus, whilst the management unit manages the RAM as at least one packet waiting list and receives for this purpose a clock signal HAC, conductors to synchronise the bit clock, label clock and packet clock are provided, and the non-destructive extraction of packets over the start bus as well as the insertion of the packets over the arrive bus is effected in a mutually asynchronous way.

The structure of the cross-point defined above is original because of its buffer registers which permit to adapt into a RAM, while there are large information flows over a start bus (arive bus respectively). This structure is also original because the RAM is managed as one (or several) waiting list(s) and because this transfer is effected in a one-way mode through the cross-point always for maintaining a high information transfer rate.

The "cross-point" functionalism forms an analogy with the space-division architectures. Actually, a cross-point can be considered a minimum change-over switch between two buses or lines. However, according to ATD technology, the switched information is not constituted by analog information but by packets of digital information bits. This particularity, which the cross-point according to the invention fully exploits, permits to combine the advantages of space-division architectures with those of time-division architectures either for recreating prior-art switch architectures or for creating novel architectures only possible with this space-division/time-division combination.

The position of the label is, chronologically speaking, at the head of each packet, which allows for the required time, during the loading of the first (or second) shift register with a given packet, to make the decision, depending on the contents of the label of this packet to extract or not to extract the building block from the start bus (or the decision to erase or not to erase the packet on the arrive bus). In this respect it is to be noted that the logic decisions to extract or insert a packet are always carried by labels, according to the invention, because the decision time is to be short relative to the bit time, whilst the high speeds sought after are given. Therefore, when the cross-point is realised in the form of two distinct circuits, as indicated hereinbelow, the latter circuits are to be located several centimetres apart only with a view to functioning properly, that is to say, not disturbing the synchronisation between information signals and the logic decision signals supplied specifically to the management unit of the RAM. Thus, the decisions to extract or insert a packet are completely distributed over the cross-points.

According to a particular embodiment of the invention, the above second building block further includes internal registers, E, F, G, and H loaded by label values, while these registers each comprise parallel outputs which may be switched over by an external signal on (the) parallel inputs of the label fields or the above first shift register, first buffer register, or the above second shift register respectively.

A cross-point is constituted by two building blocks defined above. These building blocks may be realised in the form of a single integrated circuit or in the form of two integrated circuits. In either one of the two cases the number of inputs-outputs of these circuits is high, especially for buses having 16 conductors or more, because these circuits of necessity each comprises a number of inputs-outputs which is equal to twice the number of conductors of each bus plus other inputs-outputs which will be further described hereinbelow. Preferably, the cross-point is realised in C-MOS technology and its different parts can be designed in a dynamic and/or static form. The shift registers, the buffer registers and the RAM of the cross-point are, for example, designed for the completely parallel processing of packets whose lengths are equal to or more than 288 bits. For example, the RAM comprises 128 or 256 word locations of 288 bits or over. Furthermore, it is to be noted that the information flows of the start and arrive buses may differ and ever differ considerably.

The following description referring to the annexed drawings, given by way of example, will make it better understood how the invention can be realised, in which.

The FIGS. 4 to 16 relate to portions of the second embodiment of the invention of FIG. 3.

Figure 1:
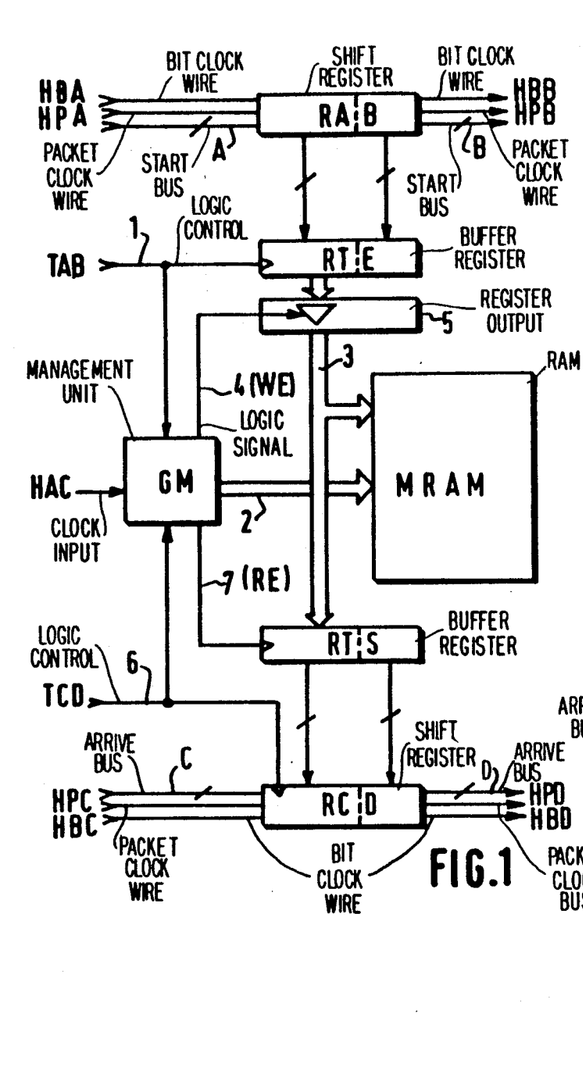
FIG. 1 shows the partial block diagram of a first embodiment of the cross-point according to the invention.

In FIG. 1 are distinguished the following elements:
A-B a first one-way bus called start bus,
C-D a second one-way bus called arrive bus,
MRAM a RAM whose word length is equal to that of a packet, that is, d bits and which can comprise m words or locations,
GM a management unit for the MRAM
RAB a first shift register A to B with parallel inputs coming from RTE,
RTE a first buffer register between RAB and MRAM
RCD a second shift register C to D with parallel inputs coming from RTS,
RTS a second buffer register between MRAM and RCD
HBA the bit clock wire of bus A
HBB the bit clock wire of bus B
HPA the packet clock wire of bus A
HPB the packet clock wire of bus B
HBC the bit clock wire of bus C
HBD the bit clock wire of bus D
HPC the packet clock wire of bus C
HPD the packet clock wire of bus D
HAC the clock input of the management unit GM
TAB a first logic control signal for the buffer register RTE and the circuit GM,
TCD a second logic control signal for the shift register RCD and the circuit GM.

The shift registers RAD and RCD are either as long as the packets, d bits, or are longer than d bits.

The information is distributed over the bus A-B at the rate of the synchronous clocks HBA and HBB, which are produced at the register RAB. The register RAB is arranged in a step-by-step fashion over the bus A-B. For each wire of the bus A-B (this bus can at least theoretically be reduced to a single wire) the bits of the packets enter, leave and are shifted in the register in series. For each packet flowing over the bus A-B, the instruction to jump from the register RAB to MRAM is determined by the logic order TAB in the given low state, over a conductor 1 to the buffer register RTE so that the latter stores, within one bit period, the contents of the register RAB and, simultaneously, to the management circuit GM of MRAM. This order results in a command to write the contents of the buffer register RTE into MRAM at an address indicating an empty word location in the MRAM. This address is transported by an address bus 2 which connects the elements GM to MRAM and which is also used as a read address bus. The actual packet transfer from the register RTE to MRAM, over a data bus 3, results in a logic signal WE in a low state, coming from the management circuit GM, transported over a conductor 4 and which transfers the output 5 of the register RTE to the low impedance state.

The operation of the bus C-D is analogous to the one described in the preceding paragraph. In this respect it is important to note that the operation of bus C-D is totally independent of operation of the bus A-B both as regards the synchronism and the information flow or decisions on packet extraction and insertion respectively. The information is propagated over the bus C-D at the rate of the synchronous clocks HPC and HBD, which are applied to the register RCD. The register RECD is arranged in a step-by-step fashion over the bus C-D. For each packet present on the bus C-D, the order in which it is transferred from the buffer register RTS to the shift register RDC is determined by means of the given logic order TCD over a conductor 5 to both the management unit GM and the shift register RCD. The action is really carried out and takes place in parallel in less than one bit period, only when a packet is completely contained in the register RCD. The order in which a packet is inserted results in a read command imposed by a (the) low-state logic signal TCD at the storage input of the register RCD. Just after this transfer a new packet is transferred from MRAM to the buffer register RTS. This second transfer is effected on the basis of the same logic signal TCD; actually, this second transfer results in a low-state logic signal RE, from the management circuit GM ordered by the low-state signal TCD, transported over a conductor 6 and which is applied to the storage input of the register RTS. During the second transfer MRAM is addressed while in a read state by the address bus 2 and the data flow from MRAM to the register RTS over the data bus 3.

The management unit GM of the memory receives logic orders TAB and TCD arriving over conductors 1 and 6 in a totally asynchronous manner. The unit GM is designed for controlling in time the access conflicts at the memory MRAM, more specifically, for organising in time the write and read cycles of the MRAM. It is a known fact, actually, that it is impossible to write and read a RAM simultaneously. If a read instruction from MRAM to RTS, resulting from the transfer of the contents from RTS to RCD, is present on the conductor 6 whilst MRAM is writing, the read instruction concerned is stored in GM until the write instruction is terminated at an instant $t_5$ and only commences after a time delay initiated at $t_5$. The symmetrical operation is identical for an instruction to write the contents from RTE into MRAM, which arrives while a read cycle is being executed. Storage and time delays are effected at GM by means of logic circuits activated by the clock HAC. It should be noted in this respect that the clock frequency HAC is equal; to or exceeds the highest frequency of clock bits HBA and HBC. In addition to controlling the read/write conflicts in MRAM, in order to ensure asynchronism between the serial registers RAB and RCD, operating at bit clocks HBA and HBC, and the MRAM, operating at the rate of a packet clock HPAB or HPCD, the buffer registers RTE and RTS, operating completely in parallel with each other, have each been associated with a serial register. In addition, they allow isolation between the address bus of the memory and the parallel accesses of the serial buses; worded differently, the parallel transfers, within one bit period, of the contents from register RAM to MRAM and of a word from MRAM to the register RCD, are thus rendered possible, and compatible with the read and write cycles of MRAM on the basis of the same address bus 2.

The memory MRAM is managed as one or several waiting lists by the management unit GM and, in either case, each waiting list ensures the change only in the direction of the bus A-B to the bus C-D. This allows realising the cross point in a simple manner on the basis a memory and a management unit. The use of a random access memory, MRAM, allows of obtaining a maximum storage capacity on an equal component surface. The management unit of the memory GM transforms MRAM into one or several waiting lists. On the other hand, as the access time for the memory is the critical element of the cross-point, the length of the words is as large as possible. Thus, for the same given number of switched bits, the access number will be inversely proportional to the word length. Under these conditions, the preferred word length is the length of a packet. The fact that the waiting list ensures changes only in a single direction corresponds to the most current operation anticipated for the cross-point. This arrangement simplifies several critical points of the realisation, that is to say: firstly, the access time for the memory is limited and this time period would be twice as long if waiting lists for the opposite directions had to be introduced; secondly, the power consumption for the access to the memory is thus reduced. This one-way traffic of the waiting list simplifies the realisation of buffer registers and serial registers, which facilitates the integration and enhances the operating speed. It should be noted that when in the preferred case MRAM comprises only a single waiting list, this memory is arranged as a FIFO. For this purpose the write and read addresses are, for example, generated by address indicators, that is to say, counters which are incremented by one unit after each write or read operation respectively, in the RAM. The memory locations of MRAM are thus cyclically sued by the two indicators, while the read indicator naturally has to be delayed with respect to the write indicator. Lockouts may result from a lock configuration such as: full MRAM if there is a write request or, in the other case, empty MRAM if there is a read request. In these two cases, the order does not have to be executed and for this purpose the management unit GM may comprise a device for measuring the ratio of fill which permanently receives the addresses of the write and read address indicators, establishes the difference between these addresses and generates write or read inhibit signals when MRAM is full or empty respectively.

The multiplexing function of the cross-point according to the invention has for its object to mix into the packet stream arriving over bus C the packet stream from the waiting list of MRAM. The resulting stream leaves at D. The realised multiplexing utilises the characteristic features of the packets UTD, that is, of being consecutive and of constant length. When there is no information there are packets whose information field has no significance. The multiplexing method is very simple and comprises only the serial register RCD between the buses C and D with a parallel input from the waiting list and which is one packet long. At the moment when the register RCD contains exactly one empty packet, the multiplexing consists of overwriting this list by the packet which is heading the waiting list, more specifically, the packet which has been loaded first into the buffer register RTS. As this replacement occurs completely inside the register RCD, there is not any conflict over access to bus C-D with another cross-point. Because of its simplicity of design, the above multiplexing method implemented by the cross-point according to the invention is very simple to integrate and allows of high speeds.

The decision logic for packet extraction or insertion is completely distributed as described hereinafter with reference to FIG. 2.

The memory MRAM can be organised, for example, as two waiting lists so as to give the second waiting list total or partial priority over the first waiting list. The second waiting list is thus the one which is emptied first as a result of total priority. For a partial priority corresponding to a mixed logic, those skilled in the art provide that, for example, the second waiting list is emptied first but during a limited period of time, after which the first waiting list can be emptied in its turn. For a subscriber who wishes to be able both to transmit and receive information, the equipment for the connection of this subscriber to a bus of the network requires two cross-points, one operating in the receive direction (from bus A-B to bus C-D), and the other in the transmit direction (from bus (C-D to bus A-B), which finds expression in a reversal of the start and arrive buses for the switching of packets.

The information streams over the buses A-B and C-D can be comparable or also very different and be counted in Mbits/s over one bus and in kbits/s over the other bus.

It should also be noted that where the shift register RCD is of necessity arranged in a step-by-step fashion over the arrive bus, as an arrive register for information from another information bus, this is not the case for register RAB over the start bus, which need not necessarily be arranged in a step-by-step fashion. Actually, the register RAB could be by-passed with respect to bus A-B, which would provide the advantage of saving, over bus A-B, on fill time of the register RAB for the propagation time of the packets. However, according to this invention it is preferred to maintain the shift register in a step-by-step arrangement over the start bus, for a better signal regeneration and a proper re-synchronisation of these signals with their clock bits. A further advantage which appears from the Figure is to retain a certain component symmetry.

The cross-point of FIG. 1 is preferably realised in the form of a single integrated circuit element in CMOS technology. For buses A-B and C-D, having 16 conductors, this element comprises 75 inputs/outputs, 64 of which are used for connections to the buses, A, B, C and D.

Figure 2:
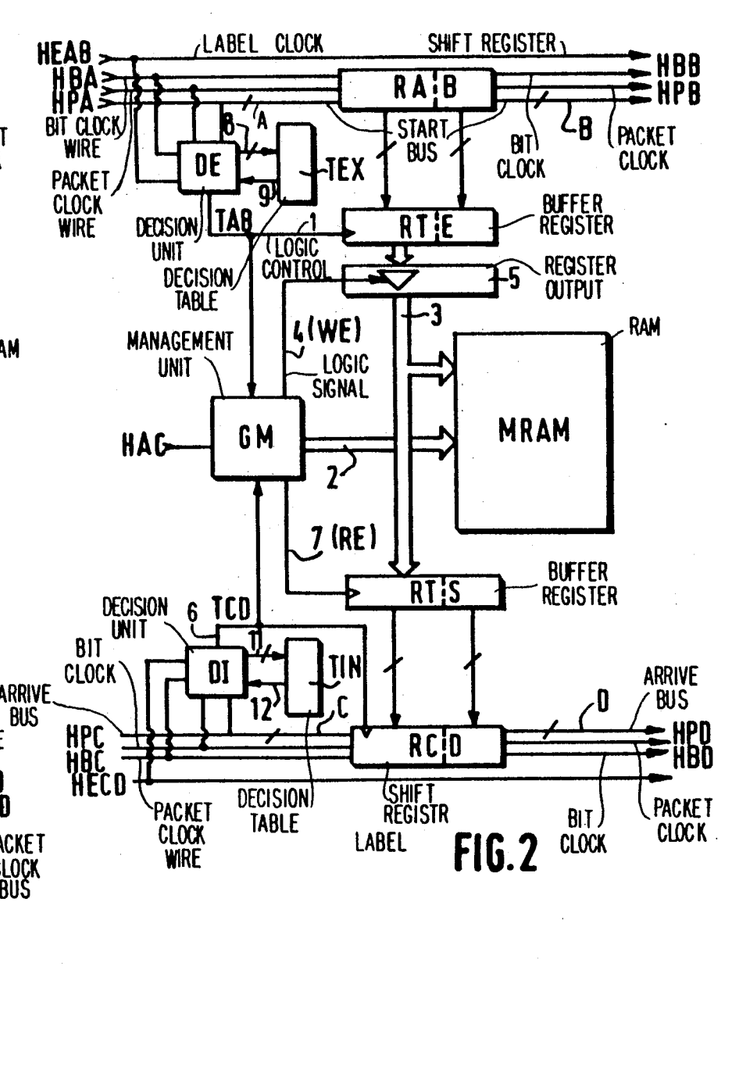
FIG. 2 is the block diagram of a first embodiment of the cross-point according to the invention.

FIG. 2 represents the first complete embodiment of the invention in which all the elements of FIG. 1 are found back and which furthermore includes the following elements:

HEAB the label clock wire of bus A-B
DE a decision unit for packet extraction from bus A-B to the memory MRAM,
TEX a decision table associated with DE
HECD the label clock wire of the bus C-D
DI a decision unit for packet insertion from the memory MRAM to the bus C-D,
TIN a decision Table associated with DI.

According to a first embodiment the label of each packet on bus A or bus C respectively, carries information necessary for packet extraction or insertion respectively.

In FIG. 2 the clock wires HEAB, HPA and HBA are connected to a decision unit for packet extraction DE as well as the conductor(s) of the bus A which is (are) associated with the label range. The clock HPA determines at DE the instant $t_2$ at which the whole packet of bus A (useful information plus label) is in the register RAB. The clock HEAB determines at DE the instant $t_1$ at which the unit DE has received the whole label of each packet. It is to be noted that the label is located, chronologically speaking, at the head of each packet, which implies that instant $t_1$ precedes instant $t_2$. The time interval $t_2-t_1$ is used for making the decision to extract or not to extract the packet contained in the register RAB at the instant $t_2$, and for effecting this transfer, in the case of a decision to extract a packet, with a clock period HBA, from the parallel register RAM to the buffer register RTE. Worded differently, when the unit DE has received the whole label it is capable of making one of the two following decisions on the basis of the contents of the label and as a function of its internal logic: in the first case, the packet has to be copied from the register RAB to the memory MRAM, and in the second case, the packet does not need to be copied into the memory MRAM. This command to copy or not to copy each packet, is applied to the conductor 1 by the unit DE; it forms the logic command TAB of FIG. 1.

In an analogous way, the clock wires HECD, HPC and HBC, as well as the conductor(s) of the bus which is (are) associated with the label field, are connected to the decision unit for packet insertion DI. At DI the clock HPC determines the instant $t_4$ at which the whole packet of bus C (useful information plus label) is in the register RCD. At DI the clock HECD determines the instant $t_3$ at which the unit DI has received the whole label of each packet. Like with the bus A-B, the label is located at the head of each packet, which implies that $t_3$ precedes $t_4$. The time interval $t_4-t_3$ is used for making the decision to insert or not to insert a packet from the register RTS containing this packet, into the register RCD, at the instant $t_4$, and to effect this transfer from the parallel register RTS to the register RCD within a clock period HBC when an insertion is decided on. Worded differently, when the unit DI has received the whole label, it is capable of making one of the following decisions on the basis of the contents of the label and as a function of its internal logic: in a first case the bus-C-packet, which carries this label, is not an empty packet and then the decision is not to make an insertion and allow the packet contained in the register RCD to leave over the bus D; in a second case, the packet from bus C is empty, that is to say, that its information field does not have any significance, and then the decision made between the instants $t_3$ and $t_4$ will be to copy the packet which is in the register RTS, coming from the memory MRAM, in the register RCD and thus overwrite the empty packet which is found there. Naturally, the fact that the packet entering bus C is empty is not necessarily sufficient to try and overwrite it in the register RCD; the packet insertion decision unit DI can actually take other information contained in the packet label into account to decide on overwriting or not overwriting the packet. The command to copy or not to copy the packet from RTS to RCD is supplied by the unit DI to the conductor 6; it constitutes the logic command TCD of FIG. 1.

The decision logic for packet extraction or insertion is constituted by the blocks DE, TEX and DI, TIN respectively. It is this logic that makes the decision to transfer a packet from one bus A-B (or C-D) to the other bus C-D (or A-B). This logic is completely distributed, that is, it is not only connected to each cross-point and, independent thereof, to that of the others, but it is also formed by two independent devices for the bus A-B and the bus C-D. The two devices use the same hardware solution and are completely programmable. It is to be noted that, for realising a change-over switch for very large powers a centralised decision logic cannot be conceived taking into account very high speeds searched for which leave too little time for finding the output line associated with each incoming packet, more specifically, as this time has to be reduced for taking into account the time of the signal propagation. In the chosen solution the decision logic is associated not only with each cross-point but also with each bus of which the distances to be covered by the decision signals are negligibly small and the decisions relate only to the packets of bus A-B or bus C-D and do not depend on any decision from another cross-point. Basically, all the information necessary for the decision is transported with the packet itself in a label field. It may be considered, however, that signals coming from the exterior seen from the cross-point are combined with the contents of the packet labels to confirm or inhibit the decisions. The solution chosen here, which is a distributed solution, permits to simply organise cross-points in different architectures; this is especially simple as the chosen solution, according to the Figure, permits in a single cycle to analyse all possible combinations of the label field which field is used for making the decision. The practical implementation of this decision logic in the cross-point is very simple as it concerns in the most simple case a table of $2^n$ bits, which is addressed by the label decision field which comprises n bits. The decision to buffer or not to buffer this packet or to replace it or not to replace it respectively, by a packet of the memory MRAM corresponds to the value 0 or 1 of the addressed bit. In FIG. 2, the unit DE is connected to the table TEX by an address bus 8 having n conductors. The label of each packet on bus A is transmitted to bus 8. The decision table TEX comprises $2^n$ locations, addressed by the bus 8 and whose contents are encoded into 0 or 1. The contents of the location addressed by the bus 8 are transmitted from TEX to DE over a conductor 9. The latter information, possibly completed by information from the exterior (not shown) is expressed at DE by a command to extract or not to extract a packet from register RAB.

The structure and operation of the units DI and TIN are identical with those of DE and TEX; they are connected to one another by the bus 11, corresponding to 8 and the conductor 12 corresponding to 9.

Figure 3:
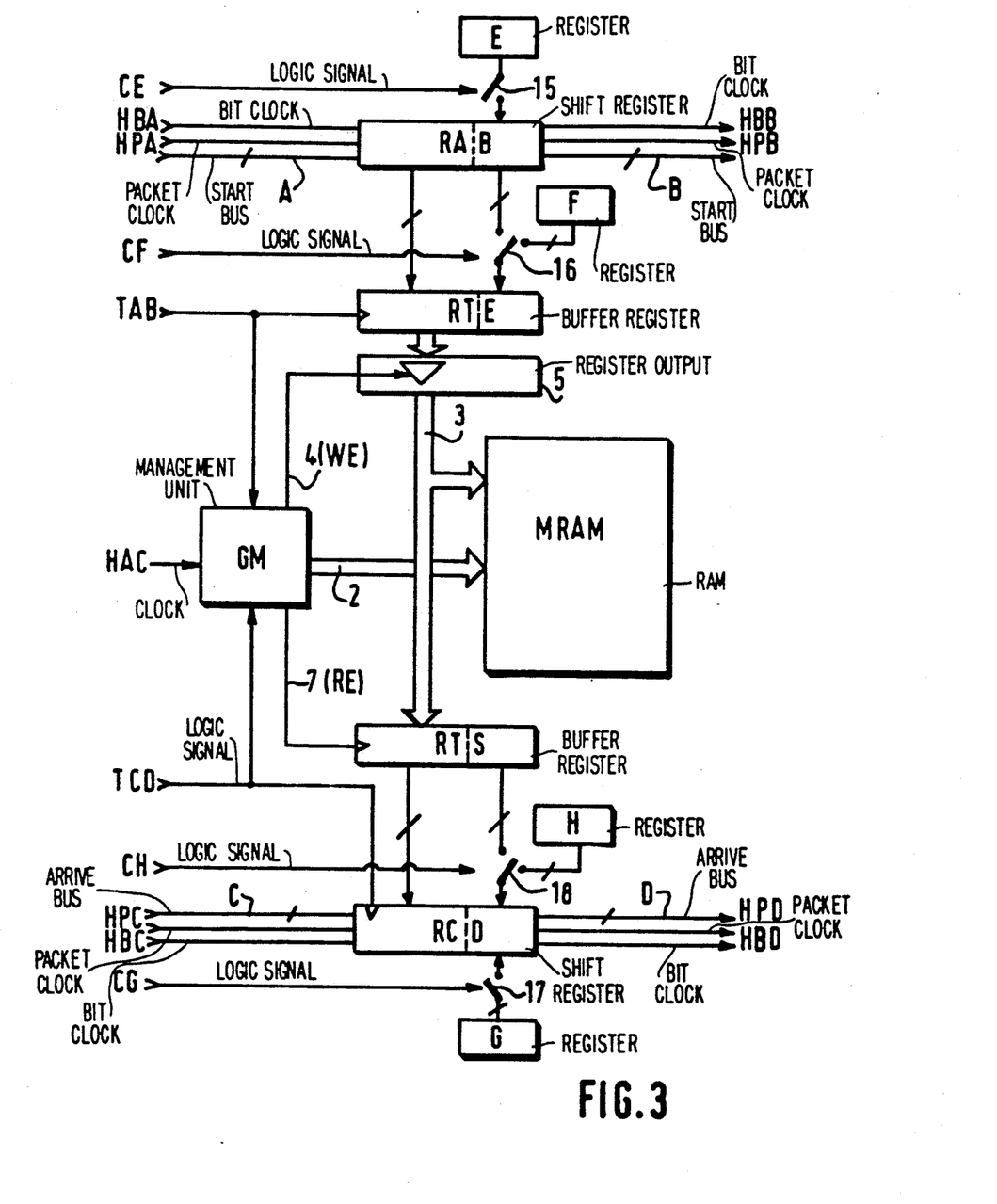
FIG. 3 is the partial block diagram of a second embodiment of the cross-point according to the invention.

FIG. 3 represents part of a second embodiment of the invention in which all the elements of FIG. 1 occur and which further includes internal registers of which the registers E, F, G, and H are intended to contain label values and the register J (not shown) a threshold value. For the third embodiment preferably the following constraints are chosen:

use of elementary gates, use of flip-flops of the D-FF type, that is, D C-MOS flip-flops equivalent to the 4013 for realising the registers.

use of a static memory block for realising the MRAM.

It is to be noted that also specific registers can be realised in the form of dynamic registers, using flip-flops of the lock-circuit type or D-L flip-flops and a dynamic memory block MRAM.

The change of the labels provided in accordance with the embodiment of FIG. 3 is suitable for switching virtual circuits according to X-25 technology.

In order to make the second embodiment of the invention complete, the following elements of FIG. 2 have to be added: HEAB, D, TEX, HECD, DI, TIN as well as their connecting lines.

The registers E, F, G and H, for example, are filled (in a manner not shown) via a synchronous serial interface; their parallel outputs are connected to parallel label inputs by multiple change-over switches, the switch 15 for E to the register RAB under the control of a logic signal CE, the switch 16 for F to the register RTE under the control of the logic signal CF, a switch 17 for G to the register RCD under the control of the logic signal CG and the switch 18 for H to the register RCD under the control of the logic signal CH. A change of label can be used, for example, in the following way as regards the label register E: it may be decided that when a packet is extracted from the register RAB and is intended for bus C-D, it is no longer useful on the start bus A-B although it continues its path over this bus. The register E is then used, when this packet passes through the register RAB, for transforming its label into a free packet label, that is, a label of a free packet, of which the useful information field, without any meaning anyhow, can be overwritten afterwards. It is to be noted that this label change on the start bus A-B is only possible with a shift register RAB arranged in a step-by-step fashion over the start bus, which is also the case in this third embodiment of the invention. The length of the register RAB corresponds at least to that of a packet. While RAB contains a packet, the latter may, by means of an external decision, be transferred into the MRAM with or without its label being changed according to the value of a logic signal CF. The output register RCD is arranged in a step-by-step fashion over the bus C-D. Its length also corresponds at least to that of a packet. When RCD contains a packet, the latter may as a result of an external decision be replaced by a packet from the MRAM with or without a label change according to the value of the logic signal CH. In addition, the packets flowing over the buses A-B and C-D may have their labels changed as a result of an external decision, under the control of logic signals CE and CG respectively.

The data are transported, for example, over 16 parallel conductors which constitute the buses A, B, C and D, while these conductors are referenced A1 to A16; B1 to B16; C1 to C16 and D1 to D16. The data over the bus A return to the shift register RAB at the rate of one bit period for the 16-bit-label (n=16) followed by 16 bit periods for the word whose useful information field is $16 \cdot 16 = 256$ bits (i=256). If P, Q, R and S represent consecutive packets on the bus A the 16 label bits for the packet P are referenced P1 to P16, for example, and after that the 256 useful information bits P17 to P272.

The general operation of the cross-point shown in FIG. 3 is as follows:

The data relating to a packet P return to the first series-to-parallel shift register RAB. When the packet P has completely arrived at AB it can be transferred to the first input buffer register RTE, within one bit period, completely in parallel, that is, simultaneously over 272 conductors, with or without a label change, controlled by the logic signal TAB.

The waiting list MRAM is realised by a RAM whose access time exceeds a clock period HBA; it is also known that simultaneous reading and writing in the RAM is impossible. If MRAM is not available at the moment when packet P is transferred to RTE, that is, if MRAM is having a read cycle, the packet P remains stored in RTE and the request to write in MRAM is also stored, in GM. When MRAM remains free, the read cycle takes place. The packet P contained in RTE is then moved to the data bus 3 of the MRAM. It is to be noted that the maximum storage time of a packet in RTE is equal to 17 clock periods HBA, that is, the time in which a packet contained in RAB is replaced by the next packet.

In a similar way the data on the bus C return to the second parallel-to-series shift register RCD. When a packet is completely contained in RCD it can be replaced by the packet contained in the second output buffer register RTS within a bit period, completely in parallel, that is, simultaneously over 272 conductors, with or without a label change, controlled by the logic signal TCD. Once this transfer has taken place and if MRAM is free (is not having a write cycle), MRAM is read for reloading RTS. Alternatively, the read request is stored in GM and fulfilled soonest possible. The reloading of RTS is always effected in a time period which is less than the time required for replacing a packet by the next packet in RCD; for a clock HBC of 128 kHz, this replacement time is equal to 132.6 $\mu$s. The management unit GM manages the address bus 2 of MRAM during the read and write cycles, so as to let this RAM operate as a waiting list. It is also this part of the component which, preferably, obtains instantaneous information about the fill of MRAM.

Figure 4:
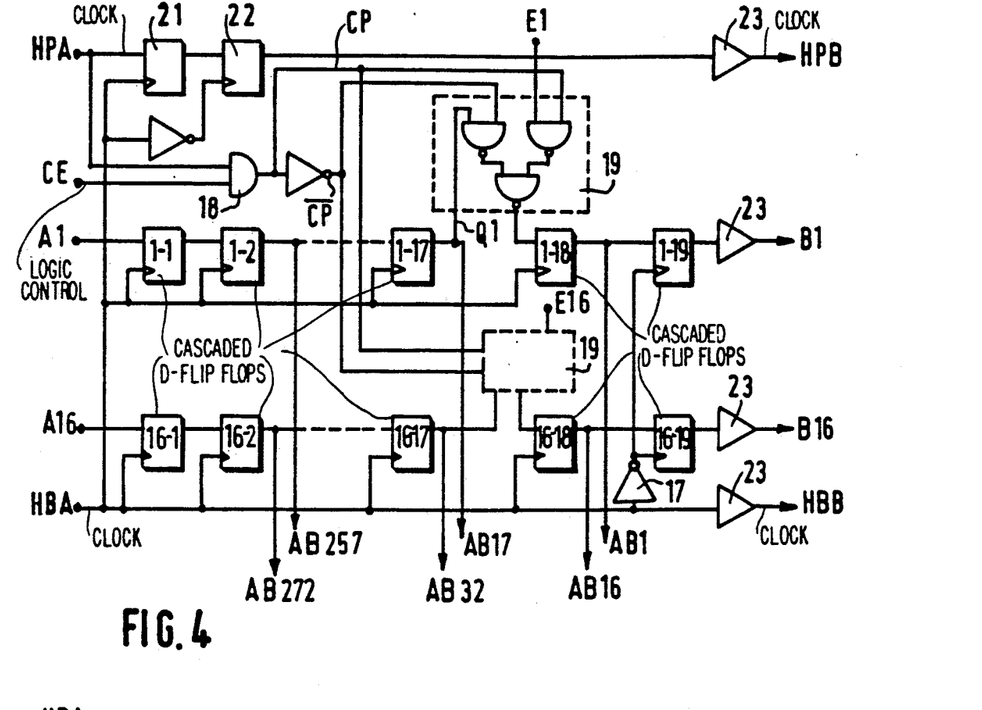
FIG. 4 shows the electric diagram of the first shift register A to B.
Figure 5:
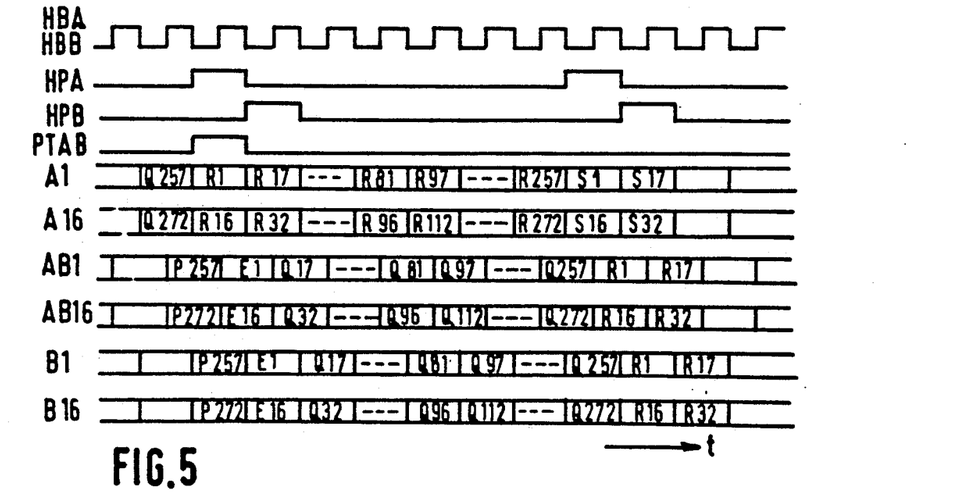
FIG. 5 is a time diagram illustrating the operation of the first shift register shown in FIG. 4.

In FIG. 4 is represented the first shift register RAB which comprises 16 serial inputs referenced A1–A16, whereas only the inputs referenced A1 and A16 are represented. The clock signals HBA, HPA and the logic control signal CE are also represented. Similarly, the output of the register RAB comprises 18 signals, which are: the data intended for B1 to B16, the clock associated with the data B, HPB, and the synchronizing signal of the packets received over the bus B, HBB. The register RAB is constituted by 16 identical subregisters, one for each data line A1 to A16. Each sub-register is formed by 19 cascaded D-FF flip-flops referenced 1-1, ..., 1-19; ..., 16-1, ..., 16-19. The 18 first flip-flops are released at the ascending edge of HBA at their increment input, for realising an 18-bit-shift register. The nineteenth flip-flop is released at the descending edge of HBA, by means of the inverter 17 so that the output signal at B1 to B16 is in phase with the input signal at A1 to A16. Thus, output data are obtained which are equal to the input data delayed by 18 periods HBA, when there is no label change. At the input and at the output, the data change state at the descending edge of the associated clock, HBA and HBB which are identical, as represented in FIG. 5 for A1, A16, B1, B16. The synchronizing signal HPA changes to the high-state for the duration of one clock period HBA because the data are in parallel on 16 lines. During this interval T$_1$ there may be a label change by means of an AND gate 18 which receives the signals HPA and CE and whose output signal CP as well as its complement $\overline{CP}$ are transmitted to a logic circuit comprising three NAND gates 19 for each sub-register. The logic circuit 19 furthermore receives the signal from the output Q of the seventeenth D flip-flop of the corresponding to the serial number of the associated sub-register, of the label register E. The output of the circuit 19 is connected to the D input of the eighteenth flip-flop. The function realised by the circuit 19 is equivalent to that of a two-position change-over switch:

$$(Q_1.\overline{CP}) + (E_1.CP)$$

The label is changed when the signals CE and HPA are simultaneously in the high-state which is supposed to be the case in FIG. 5.

The eighteenth flip-flop of the 16 shift sub-registers can be pre-loaded by the contents of the register E so as to modify the label of a packet frame. This pre-loading is realised by moving the contents of the register E to the inputs of the 16 flip-flops during the signal HPAV in the high-state, providing that the signal CE is also in the high-state during this interval. When there is no label change, the data at B1 to B16 and the signal HPB are equal to the signals received to A1 to A16 respectively, and the signal HPA delayed by a period T, as indicated by R1, R16 in FIG. 5, which constitutes the original label of the packet R. The value of T is assumed to be equal to 18 clock periods HBA. Actually, it is necessary to synchronize HPB with HBB. This realised in a simple manner by delaying HPA by one clock period, by means of input flip-flop 21 and output flip-flop 22 which each shifted by a half period to create the signal HPB rather than delaying the signal HPA by 273 periods HBA. This simplification of synchronization is attained by delaying the data by 18 instead of 17 clock periods. At the outputs of the register RAB are represented regenerative signal amplifiers. The 272 parallel bits of each packet are obtained every 17 clock periods HBA at the 272 outputs of the D flip-flops 2 to 18 of the 16 sub-registers. The time sequence of the bits of 4 consecutive packets P, Q, R and S at the serial inputs and outputs A1 to AB16 for and B1 to B16 as well as the parallel outputs AB1 to AB16 for the label carriers and outputs AB17 to has been represented in FIG. 5. At the parallel outputs AB1 to AB272 the data are shifted by a half clock period.

Figure 6:
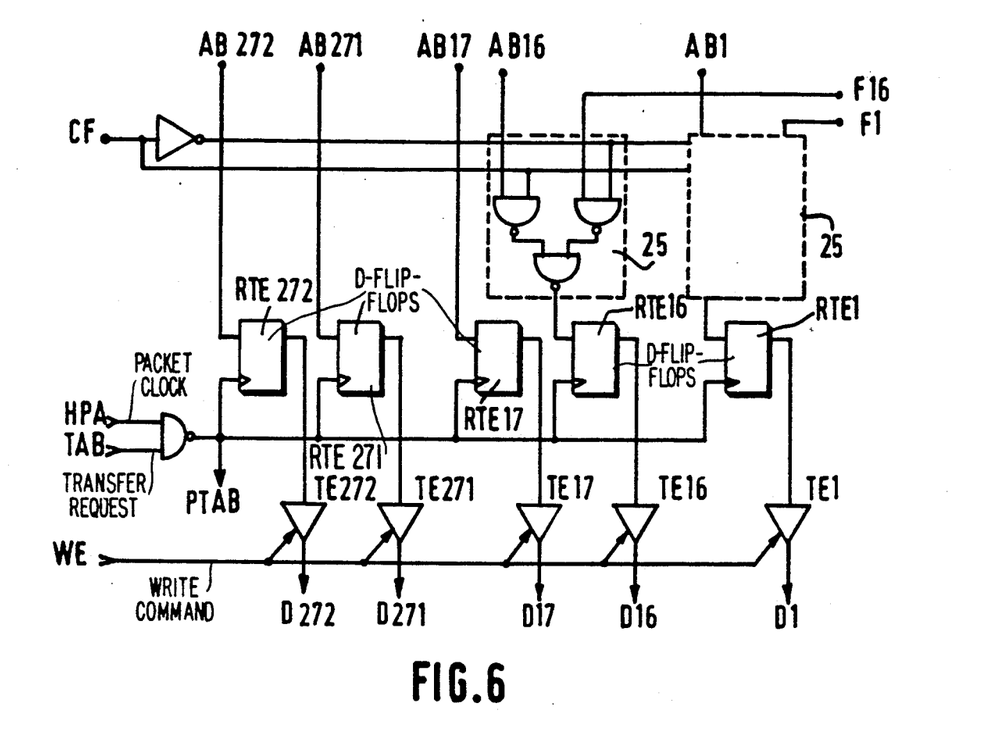
FIG. 6 shows the diagram of the first buffer register.

FIG. 6 represents the first buffer register or input buffer register RTE. This register comprises: D=272 parallel inputs corresponding to d outputs RAB. These inputs are connected to the inputs D of as many D-flip-flops referenced RTE1 to RTE272 of which only 5 are represented. These d D flip-flops are incremented by the logic signal HPA.TAB. More specifically, it is the function of the register RTE to store the frame (the packet) contained in the register RAB when the latter is to be transferred to MRAM; this storage takes place at the decending edge of HPA if the signal TAB is in the high-state at that moment. On the other hand, the signals AB1 to AB16 are replaced by the label contained in F1 to F16 if the signal CF is in the low-state. For the label switching there is a logic device which is in every respect comparable to that of FIG. 4 described hereinbefore: 16 arrangements comprising three NAND gate circuits 25 permit to make the choice between the signals at AB1 to AB16 or the signals at F1 to F16, at the inputs of the flip-flops RTE1 to RTE 16, as a function of the high-state or low-state respectively, of the signal CF. It is to be noted in this respect that there is no packet transfer request by TAB with the signal CF in the high-state, neither is there a simultaneous request to change the packet label comprised in the register RAB by means of the signal CE. It is simply indicated that the signals CE and CF are designed for not causing label conflicts. The D-flip-flop outputs TE1 to TE272 are connected to the buses D1 to D272, that is, the data bus 3 of MRAM during the low-state of WE. As described hereinafter WE is a write command, initiated by the signal TAB, originating from unit GM, which acts on the output 5 of RTE by a 3-state command, as it is, by moving it to the low-impedance state.

Figure 7:
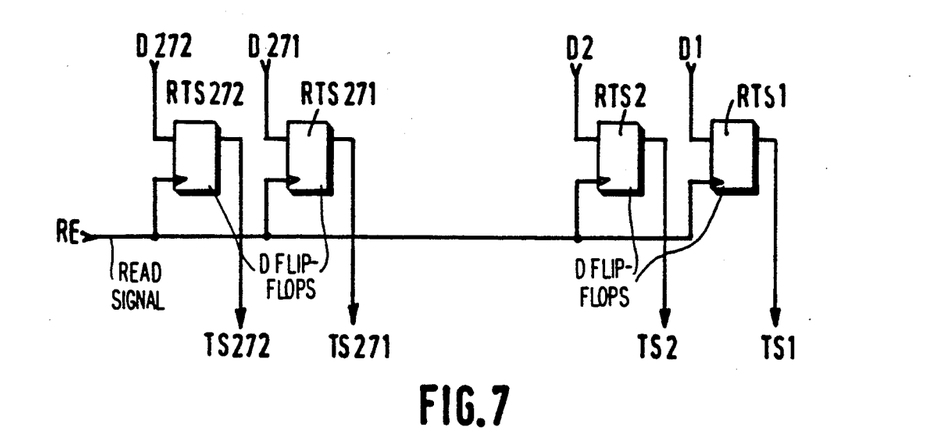
FIG. 7 shows the diagram of the second buffer register.

The buffer register RTS represented in FIG. 7 is a 272-bit parallel-to-parallel register, constituted by 272 D flip-flops RTS1 to RTS272 whose D inputs are connected to the MRAM data bus 3, D1 to D272 and the outputs Q referenced TS1 to TS272 are connected to the output register RCD. The data from MRAM are store in RTS at the descending edge of the logic signal RE, a read command of MRAM produced by the unit GM over the conductor 7. The signal RE is initiated in the unit GM on the basis of the signal TCD and acts on the increment inputs of the D flip-flops of the register RTS.

Figure 8:
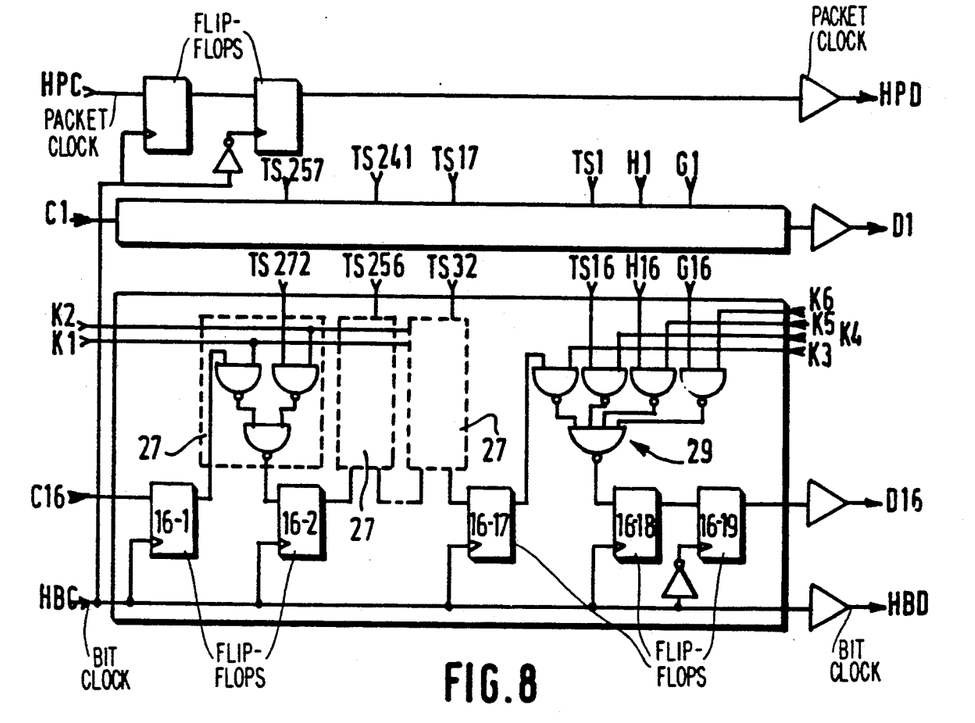
FIG. 8 shows the diagram of the second shift register C to D.
Figure 9:
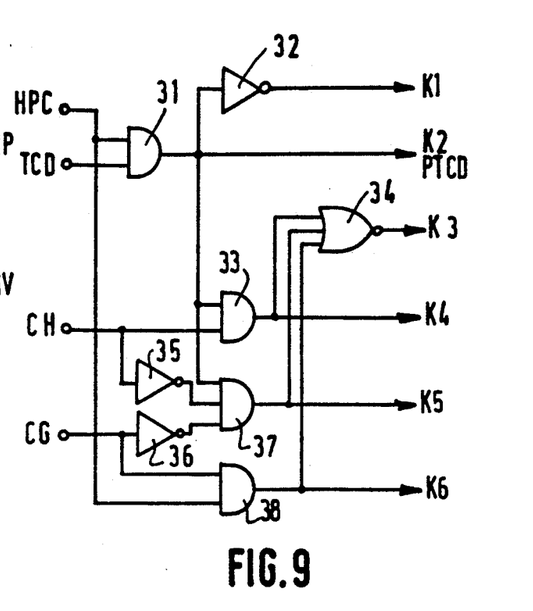
FIG. 9 represents a logic circuit used for generating logic signals to be applied to certain inputs of the circuit shown in FIG. 8.

The second shift register RCD is represented in FIG. 8; it comprises d parallel inputs connected to the outputs of RTS and referenced in the same fashion, TS1 to TS257. The parallel inputs are subdivided into groups of 16 inputs in 16 identical sub-registers of which only two sub-registers, the first and the last, are represented. Each sub-register receives a serial input signal from bus C, such as C1, C16, and comprises a serial output to the bus D, such as D1, D16. As with the register RAB, the clock signals HBC and HPC are also supplied, while the connections and the resultant produced clock signals HBD and HPD are analog and comparable to those described hereinbefore with referenced to the FIGS. 4 and 5. On the other hand, in contrast with the register RAB, it is to be noted that the insertion logic of the information bits is more complex. Actually, in RCD there is a binary choice for the useful information concerning the flip-flops 1-1, ..., 1-17; ...; 16-1, ..., 16-17 of the sub-registers and a choice of one to four for the label information concerning the flip-flops 1-18 to 16-18. The binary choices which relate to either the useful information of i bits of the packet from bus C or the useful information of i bits of the packet from the registor RTS, are made within one clock period HBC, by means of logic circuits having three NAND gates 27 which operate as the circuits 25 of the FIG. 6 but, as it is, the logic signal and its complementary signal which are transmitted to the inputs of the circuits 27 are the signals K2 and K1 obtained by the logic circuit of FIG. 9 (AND gate circuit 31 and inverter 32):

$K2 = HPC.TCD = PTCD$ $K1 = \overline{K2} = \overline{HPC.TCD}$

Similarly, the choice of n label bits, from bus C, register RTS, register H or register C, is made by means of logic circuits having five NAND gates 29 which receive the signals K3, K4, K5, and K6 generated by the logic circuit of FIG. 9 on the basis of the logic signals: HPC, TCD, CH, and CG.

Figure 10:
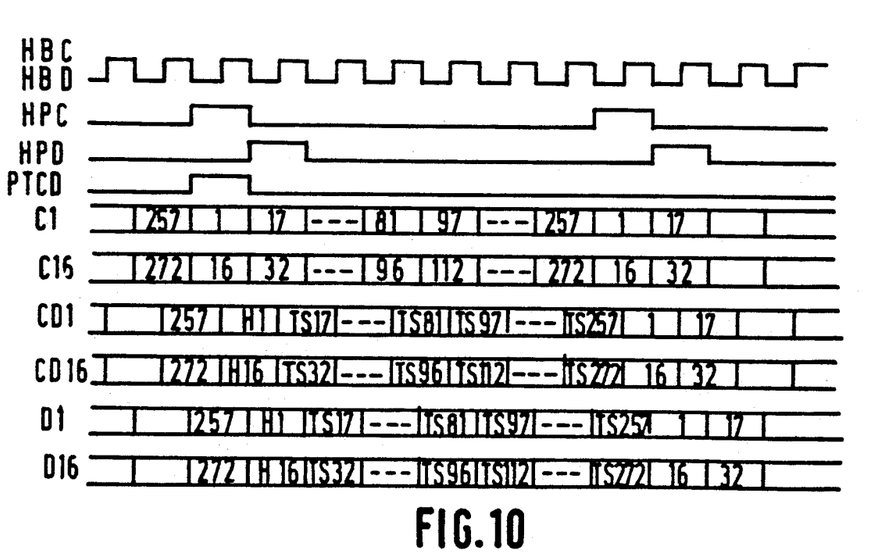
FIG. 10 is a time diagram illustrating the operation of the second shift register shown in FIG. 8.

At the input and output of the register SCD the data change state at the descending edge of the associated clock as represented in the time diagram of FIG. 10, in which the information bits are marked only by their serial numbers except for those coming from RTS whose serial numbers are preceded by the letters TS. The synchronizing signal changes to the high-state for the duration of the 16 label bits. Thus, as it is, it takes one clock period HBC before the data are in parallel on 16 wires. When there is no label change, the data D1 to D16 on the bus D and the signal HPD are equal to the data C1 to C16 received from bus C and to the signal HPC delayed by a time period T'. The value of T' is taken to be equal to 18 clock periods HBC. Actually, it is necessary to synchronize HPD with HBD. This is effected by delaying PC by one clock period to create PD rather than delaying HPC by 273 bits. Like for the register RAB the data are delayed by 18 bits and not by 17 bits, by means of the same construction, in order to be able to delay HPD by 1 bit relative to HPC and simply guarantee that synchronisation between HPD and HBD is maintained. The 17 flip-flops k-2 to k-18 (k varying from 1 to 16) of the 16 sub-shift registers can be preloaded by the contents of the output buffer register RTS, so as to realise a transfer of a packet contained in MRAM to the arrive register RCD. This preloading is realised by applying the contents of the register RTS to the inputs of the 272 D flip-flops for the duration of the high-state signal PTCD, coming from HPC, provided that the transfer logic allows same.

The last flip-flop 1-18 to 16-18 of the 16 sub-shift registers can be preloaded by the contents of the registers G or H so as to change the label of a packet. This loading is realised in a way identical with that described in the preceding paragraph with respect to the selected decision logic. This decision logic is, for example, that which is indicated in the following table I in which the * symbolises a logic state which is unimportant, 1 or 0.

TABLE I

| | ACTION | Logic Function | HPC | TCD | CH | CG |
|---|---|---|---|---|---|---|
| DATA | No transfer | K1 | condition K2 not fulfilled | | | |
| | Transfer MRAM | K2 | 1 | 1 | * | * |
| LABEL | No transfer | K3 | conditions K4, K5 or K6 not fulfilled | | | |
| | Transfer MRAM | K4 | 1 | 1 | 1 | * |
| | Transfer H | K5 | 1 | 1 | 0 | 0 |
| | Transfer G | K6 | 1 | * | * | 1 |

The logic functions K3, K4, K5 and K6 are realised by the logic circuit of FIG. 9 (AND-gate circuits 31, 33, NAND 34 for K3, AND-circuits 31 and 33 for K4, inverters 35 and 36, AND-circuit 31 and AND-circuit 37 for K5 and AND-circuit 38 for K6). Actually the following is obtained:

$K3 = \overline{[(HPC.TCD).CH] + [(HPC.TCD).CH.CG] + (C-G.HPC)}$ $K4 = HPC.TCD.CH$ $K5 = HPC.TCD.\overline{CH}.\overline{CG}$ $K6 = \overline{CG}.HPC$ It will have been noticed hereinbefore that control signal CG is chosen in preference to control signal CH.

Furthermore, it will have been noticed in FIG. 10 that there is a label transfer, as it is, of the register H during the transfer of a packet from the register RTS to the register RCD, which corresponds with a high-state logic signals K5, that is, as indicated at line 5 of the above Table I, HPC and TCD in the high state and CH and CG in the low state.

Figure 11:
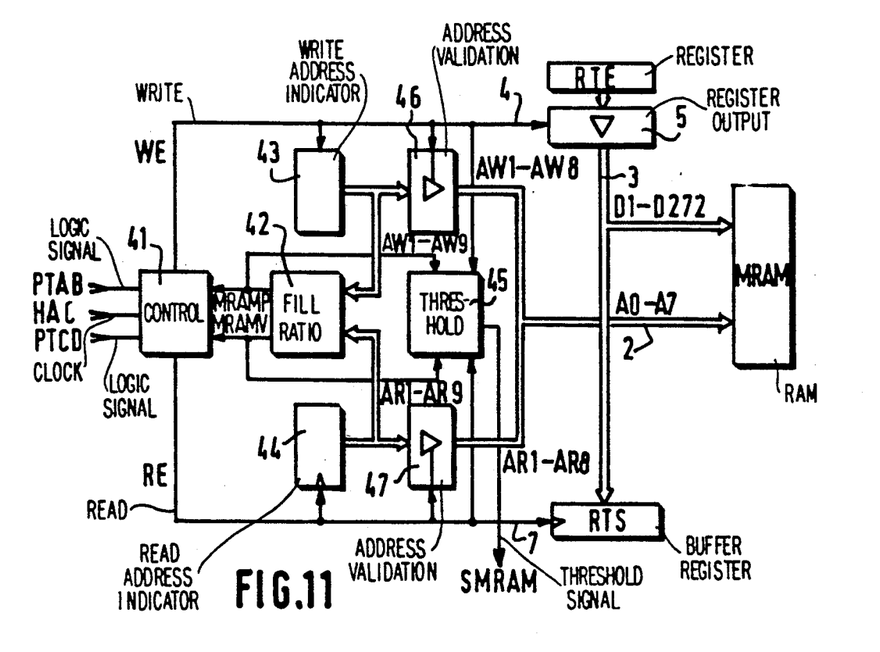
FIG. 11 is a block diagram of a management unit of the RAM, connected to the buffer registers and the RAM.

FIG. 11 shows by way of a block diagram the management unit GM of MRAM and the following FIGS. 12 to 16 show the sections of the unit GM or are used for explaining the operation of these sections.

The unit GM effects the address control of MRAM. It is essentially composed of 5 blocks:
the control block of MRAM 41
the fill ratio block 42
the write address indicator 43
the read address indicator 44
the MRAM threshold circuit 45

In the right-hand portion of FIG. 11 certain elements of FIG. 3 occur such as the register RTE and its output 5, MRAM, the data bus 3, the address bus 2, the buffer register RTS and the conductors 4 and 7. The control block 41 receives the clock signal HAC, the logic signals PTAB and PTCD and, coming from block 42, two logic signals MRAMP and MRAMV. The signals PTAB and PTCD are the signals TAB and TCD validated by the respective high-state signals HPA and HPC. The signals MRAMP and MRAMV indicate whether MRAM is full or empty respectively. The block 41 transmits the signal WE to the write address indicator 43, an address validation unit 46, the circuit 45, the conductor 4, and the signal RE to the read address indicator 44, a read address validating unit 47, the circuit 45 and the conductor 7. The circuit 45 further receives the signals MRAMP and MRAMV and transmits a threshold signal SMRAM. The write address indicator 43 transmits, via the validating circuit 46, over the address bus 2 the write address in 8 bits, referenced AW1 to AW8 at the output of 43, thereafter designated as A0 to A7 over the bus 2 and, directly, the bits AW1 to AW8 plus the most significant bit AW 9 also referenced PFE to the fill ratio block 42. In a similar way, the read address indicator 44 transmits, via the validating circuit 47, over the address bus 2 the read address in 8 bits, referenced AR1 to AR8 at the output of 44, thereafter designated as A0 to A7 over the bus 2 and, directly, the bits AR1 to AR8 plus the most significant bit AR9 also referenced PFL to the fill ratio block 42.

As already described hereinbefore, the memory MRAM is managed a waiting list. The control block 41 determines the write and read cycles as a function of the packet transfers from RAB to MRAM and from MRAM to RCD. It also shows if MRAM is empty or full. The write address indicator 43 provides the memory location where the packet contained in RAB and then in RTE has to be written into MRAM. It is incremented after each reading. The read address indicator 44 provides the memory location where the packet has to be read so as to be written into RTS and then into RCD. It is incremented after each reading. The threshold circuit 45 supplies the signal SMRAM which indicates whether MRAM is filled to above the level of a preset threshold contained in a register J (not shown) for example, included in the circuit 45.

The fact that a RAM is used for realising the desired function of waiting list causes the following constraints: firstly, it is not necessary to read at a location where there are no data; the read counter thus always has to be delayed relative to the write counter. Secondly, writing is not necessary beyond the memory zone which is not yet read. Under these conditions, it is necessary to supervise the read and write progressions. A simple comparison of the indicators 43 and 44, which are counters, is insufficient. Actually, because of its cyclic structure, the write counter is sometimes larger sometimes smaller than the read counter. The considered resolution consists of feeling one extra bit, the most significant bit, to each indicator-counter, to determine whether the read and write indicators are in the same operation of RAM or in two adjacent operations. These most significant bits are referenced AW9 (PFE) and AR9 (PFL). The comparison of the write and read addresses as well as their significance provides the following indications:

Correct MRAM→Authorisation to read or write

Empty MRAM→Stop reading

Overflow→stop reading

Full MRAM→stop writing

Overflow→stop writing

The Table II below indicates the criteria to be satisfied of the decision logic which is effected in the first place by the fill ratio block 42 for determining logic signals MRAMP and MRAMV and then by the control block 41 for determining the logic signals WE and RE.

TABLE II

| PFE | PFL | AW=AR | AW>AR | ACTION | MRAMV | MRAMP |
|---|---|---|---|---|---|---|
| 0 | 0 | 0 | 1 | Correct MRAM —> read or write | 0 | 0 |
| 0 | 0 | 1 | 0 | Empty MRAM —> stop reading | 1 | 0 |
| 0 | 0 | 0 | 0 | Overflow —> stop reading | 1 | 0 |
| 1 | 0 | 0 | 1 | Overflow —> stop writing | 0 | 1 |
| 1 | 0 | 1 | 0 | Full MRAM —> stop writing | 0 | 1 |
| 1 | 0 | 0 | 0 | Correct MRAM —> read or write | 0 | 0 |
| 1 | 1 | 0 | 1 | Correct MRAM —> read or write | 0 | 0 |
| 1 | 1 | 1 | 0 | Empty MRAM —> stop reading | 1 | 0 |
| 1 | 1 | 0 | 0 | Overflow —> stop reading | 1 | 0 |
| 0 | 1 | 0 | 1 | Overflow —> stop writing | 0 | 1 |
| 0 | 1 | 1 | 0 | Overflow —> stop writing | 0 | 1 |
| 0 | 1 | 0 | 0 | Correct MRAM —> read or write | 0 | 0 |

The fill ratio block 42 includes in the first place a register comparator (not shown) which receives the bits AW1–AW8 and the bits AR1–AR8 and then compares the contents of the write 43 and read 44 address indicators. This prior-art comparator could be constituted, for example, by several C-MOS digital integrated circuits, of the HEF4585B type, a compare-by-4-bits comparator, realised by Philips Ltd. The output of the comparator, in a positive logic state as is generally the case in the present description, is constituted by the logic signals: AW=AR (equal contents of the indicators for the high level), and: AW>AR (the write indicator ahead of the read indicator for the high level).

Figure 12:
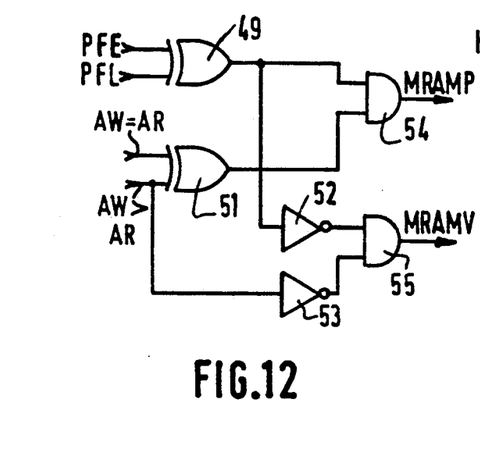
FIG. 12 represents a logic circuit used for generating logic signals within the management unit of the RAM.

The fill ratio block 42 further includes the logic circuit of FIG. 12 which receives the logic signals PFE and PFL from the indicators 43 and 44, the logic signals: AW=AR and AW>AR from the above comparing registers and which supplies the signals MRAMP and MRAMV. For obtaining the logic Table II with respect to MRAMV and MRAMP, the logic circuit of FIG. 12 includes two EXCLUSIVE-OR gate circuits 54 and 55 which produce at their outputs the signals MRAMP and MRAMV respectively. The circuit 49 receives the signals PFE and PFL, the circuit 51 receives the signals AW=AR and AW>AR, the circuit 54 receives the output signals of the circuits 49 and 51 and the circuit 55 receives the inverted output signal of the circuit 49 and the inverted signal AW>AR.

Figure 13:
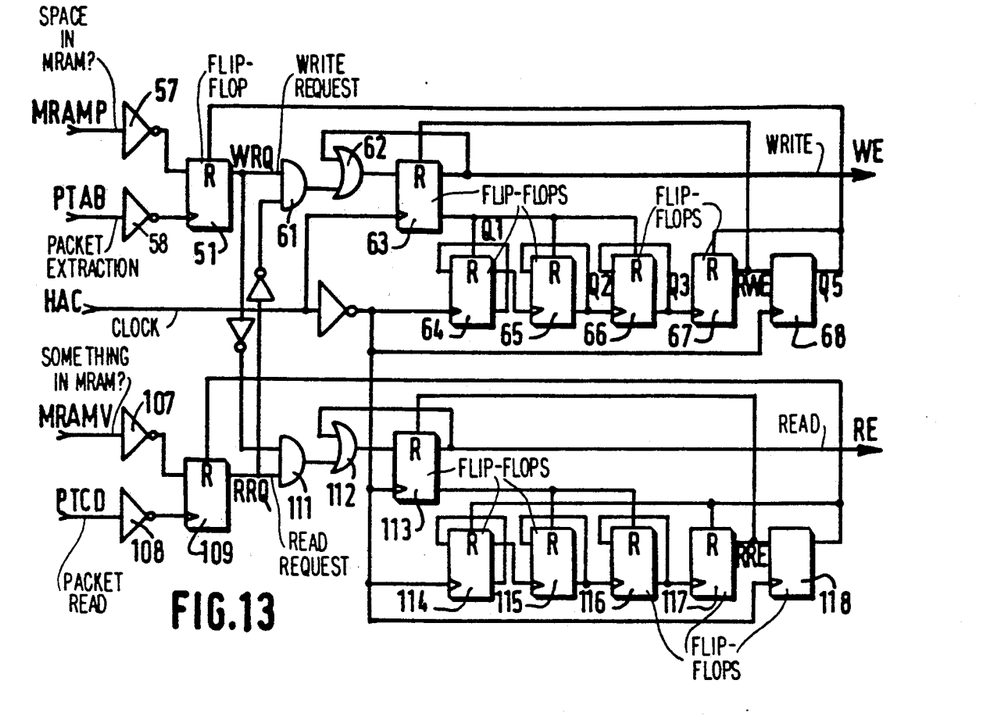
FIG. 13 is an electronic diagram of the control circuit block of the RAM represented in FIG. 11.
Figure 16:
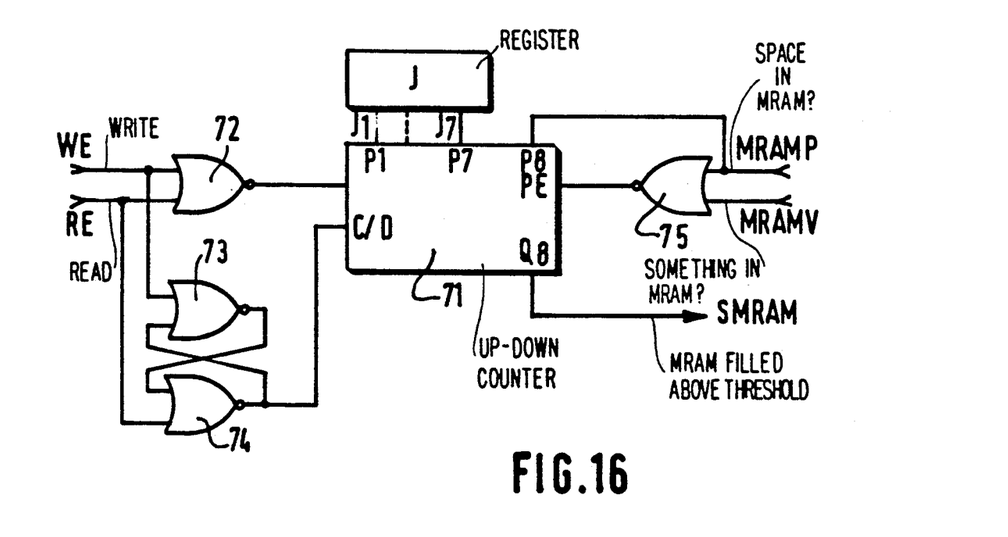
FIG. 16 is an electronic diagram of the threshold circuit represented in FIG. 11.

The control block 41 is represented in more detail in FIG. 13 and the time diagrams of FIG. 16 are used to explain its operation. For a same read or write operation in the MRAM a same structure is used which is shown between the top part (writing) and bottom part (reading) of the FIG. 13. For generating the signal WE, the block 41 comprises two inverters 57, 58, a D-flip-flop 51 of which the output is referenced WRQ, and AND circuit 61, an OR circuit 62, a D-flip-flop 63 whose output generates the signal WE and whose $\overline{Q}$ output is used for resetting the D-flip-flop 65 and 66 and the D-flip-flops 67 and 68 to zero. The respective $\overline{Q}$ outputs of the flip-flops 64, 65 and 66 are referenced Q1, Q2 and Q3 respectively, and the Q outputs of the flip-flops 67 and 68, RWE and Q5 respectively, Q1, Q2, Q3, RWE and Q5 also designating the logic signals carried by these outputs. The flip-flops 59 and 67 are reset to zero by the signal Q5 and the flip-flop 63 by the signal RWE. The AND circuit 61 receives the signal WRQ and the inverted signal RRQ, whereas RRQ is the corresponding read signal WRQ, and its output is connected to an input of the OR circuit 62 which receives the signal WE at another input. The output of the circuit 62 is connected to the D input of the flip-flop 63 which receives at its storage input the clock signal HAC. The signals Q1, Q2 and Q3 are fed back to the D inputs of the flip-flops 64, 65, 66 respectively. The output Q of the flip-flop 64 is connected to the storage input of the flip-flop 65. The signals Q2 and Q3 are supplied to a storage inputs of the flip-flops 66 and 67 respectively. The storage inputs of the flip-flops 64 and 68 receive the inverted clock signals HAC. The corresponding elements which generate the logic signal RE are referenced 107 to 118 and the corresponding signals RRQ, RRE are found there. Only a single minor difference between the top and bottom part of the diagram of FIG. 13 is the fact that the flip-flop 114 is reset to zero on the basis of the Q output of flip-flop 118 and not on the basis of $\overline{Q}$ output of the flip-flop 113.

Figure 14:
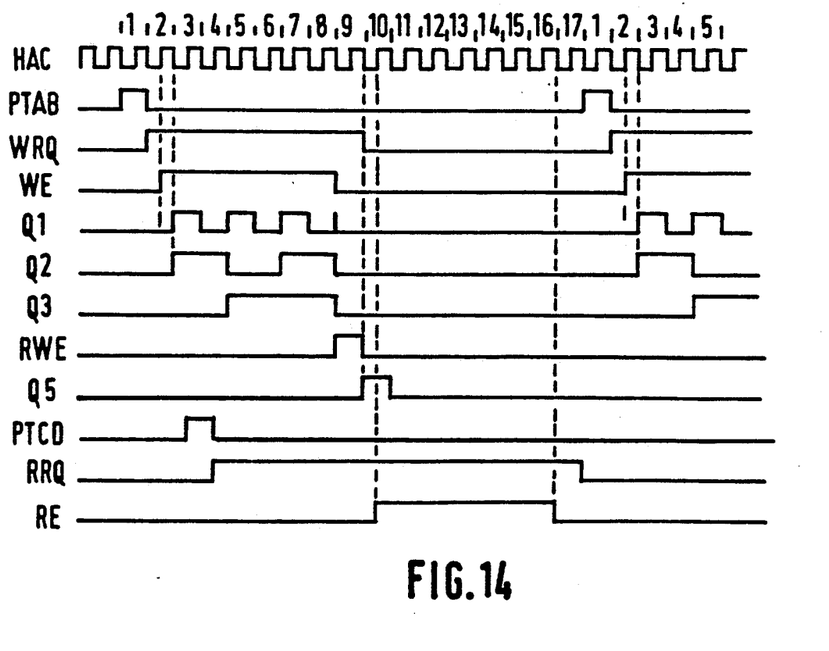
FIG. 14 is a time diagram illustrating the operation of the circuit shown in FIG. 13.

This circuit diagram permits to obtain the desired time diagrams described in FIG. 14 where it is assumed that a read request is made whilst a write request is being made. All the logic represented in FIG. 13 is controlled by the HAC clock whose frequency has to be higher than or equal to the higher one of the two clocks HBA an HBC. The logic packet extraction signal to the register RTE, PTAB is stored in 41, in order to provide the write request signal WRQ, on condition that MRAM is not full, that is: MRAMP=0, if not, the packet is lost. If MRAM is not engaged in the read cycle, that is to say, if RRQ=0, see FIG. 14, WRQ, which assumes the high state, will also make the write signal WE assume the value 1 for 6.5 periods of HAC, whilst the latter duration is determined by the set of flip-flops 64, 65, 66. If, alternatively, MRAM was engaged in the read cycle, the write cycle would be triggered 1.5 periods of HAC after the read signal RE, marking the end of the read cycle, has passed to the low state. The logic signal PTCD, for reading a packet into the MRAM and storing it into the register RTS, is stored for providing the read request signal RRQ, on condition that MRAM is not empty, that is: MRAMV=0; if not, the read request is lost and RTS preserves its former contents. If MRAM is not engaged in the write cycle, that is, WRQ=0, RRQ, which passes to the high-state, causes the read signal RE to assume the value 1 for 6.5 periods of HAC. If, alternatively, MRAM is requesting a write cycle or engaged in a write cycle, as represented in FIG. 14, the read cycle is triggered 1.5 periods of HAC after the write signal WE, marking the end of the write cycle, has passed to the low state. Thus, the write and read requests in MRAM are made compatible, which guarantees total asynchronism which is required between these requests and the actions indicated in the Table II below are realised properly.

Figure 15:
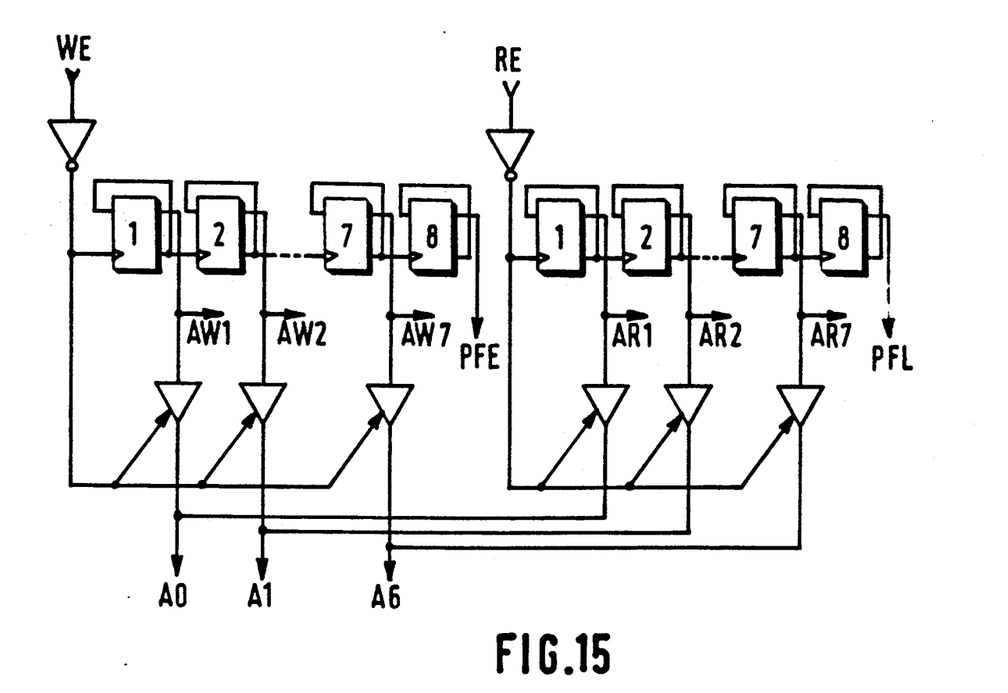
FIG. 15 is an electronic diagram of the write and read address indicators which are represented in FIG. 11.

The write address indicator 43 represented in FIG. 15, with its output arrangement 46, is an asynchronous 8-bit counter counting from 0 to . . . 255. It is incremented at each descending edge of WE. The bits AW1 to AW8 are moved to a low-impedance state and applied to the address bus 2, A0–A7 of MRAM during the high state of WE. The bit AW9 is the most significant write bit PFE. FIG. 15 also represents the elements 44 and 47.

Preferably, the cross-point also includes the threshold circuit of MRAM 45 represented in FIG. 16. This circuit 45 does not add to the operation of the cross-point directly but indirectly, via the network to which this cross-point belongs. Actually, the circuit 45 supplies the logic signal SMRAM which is information about the filling state of MRAM. By means of the network, this information may affect the logic signals TAB and TCD. The circuit 45 comprises the register J connected by its parallel outputs J1 to J7 to the inputs P1 to P7 of an up-down counter 71, and 4 NOR gate circuits 72, 73, 74, and 75. The circuit 72 receives the signals WE and RE and its output is connected to the data input of the up/down counter 71. The signal WE is applied to an input of the circuit 73 whose second input is connected to the output of the circuit 74. The signal RE is applied to an input of the circuit 74 whose second input is connected to the output of the circuit 73 and whose output is connected to the up/down counter input of the circuit 71. The circuit 75 receives the signals MRAMP and MRAMV and its output is connected to the reset input PE of the counter 71. The signal MRAMP is also supplied to the input P8 of the circuit 71. The register J comprises the complement value of a threshold S, that is: 128-S, the threshold to which one wishes to compare the instantaneous contents of MRAM. The signal SMRAM at the output Q8 of the circuit 71 passes from the low to the high state when MRAM is filled to above the threshold S. Thus, the Q8 bit of the counter indicates, when it is at 1, that MRAM is filled to above the threshold S. This is achieved owing to the fact that the up-down counter 71 is incremented at each write command, and is decremented at each read command. It is to be noted that the addressing of MRAM is effected over 7 bits, whereas the counter 71 counts over 8 bits. When MRAM is empty, the counter 71 is immediately preset to the value: 128-S for the bits 1 to 7 and to zero for the bit 8. When MRAM is full, the counter 71 is immediately preset to the value: 128-S for the bits 1 to 7 and to 1 for the bit 8.

The two embodiments of the invention are realised preferably in C-MOS technology, in the form of one or two integrated circuit components; when there are two components they are inserted several centimetres apart, in view of their operation, one of them being constituted by the elements DE, TEX, DI, TIN represented in FIG. 2.

We claim:

1. A circuit for use as a cross-point between two one-way buses, which one-way buses are independent of one another, for asynchronous time-division multiplexing of digital information, which digital information is in the form of consecutive fixed-length data packets transported over the one-way buses, which circuit selectively transmits digital information between the one-way buses, the circuit comprising
   I. a first integrated circuit building block comprising the following circuit elements connected in cascade in the order indicated, between one of the one-way buses, called start bus, and the other of the one-way buses, called arrive bus:
      a) a first shift register having at least one serial input and d parallel outputs, where d is an integer greater than one, which shift register is inserted in the start bus,
      b) a first buffer register having d parallel inputs and d parallel outputs,
      c) a RAM having m locations, where m is an integer greater than one, of d bits, the RAM having
         i) an input, for coupling to an address bus, for receiving address information for the m locations from the address bus, and
         ii) means for coupling to the outputs of the first buffer register and to the inputs of a second buffer register,
      d) the second buffer register having d parallel inputs and d parallel outputs, and
      e) a second shift register having d parallel inputs and at least one serial output, said second shift register being inserted into the arrive bus, and
   II. a second integrated circuit building block for: controlling the first integrated circuit to non-destructively extract packets from the start bus and to insert packets over the arrive bus, the extraction and insertion not being specifically synchronized with one another, the second block comprising
      a) at least one decision unit for
         i) extracting label data from the start bus,
         ii) controlling the first buffer register to download contents of the first shift register based on the label data and
         iii) controlling the second buffer register to upload into the second shift register, thereby inserting data into the arrive bus,
      b) at least one respective preprogrammed decision table, associated with the decision unit, and having an input for receiving label data of the packets on the start and arrive buses,
      c) a management unit for managing the RAM, under control of the decision unit, as at least one packet queue, the management unit having an output for coupling with the address bus of the RAM.

2. The circuit of claim 1, characterized in that the second building block further includes internal registers E, F, G, and H for receiving and storing label values, each such internal register comprising a plurality of parallel outputs which may be switched to parallel inputs of label fields of the first shift register, first buffer register, second buffer register, or the second shift register, respectively.

3. The circuit of claim 1, wherein $d \geq 44$.

4. A single integrated circuit component comprising the circuit of claim 1.

5. The circuit of claim 1 comprising
   a first integrated circuit component containing the first integrated circuit building block, and
   a second integrate circuit component containing the second integrated circuit building block.

6. The circuit of claim 5 wherein the first and second integrated circuit components are disposed several centimeters apart.

7. The circuit of claim 1 built in C-Mos technology.

8. The circuit of claim 1 wherein
   the first shift register has 16 serial inputs and is for holding packets which are d bits in length;
   the second shift register has 16 serial outputs and is for holding packets which are d bits in length;
   $d \geq 272$; and
   $m \geq 128$.

* * * * *